United States Patent [19]

Irgens et al.

[11] Patent Number: 4,986,942
[45] Date of Patent: Jan. 22, 1991

[54] METHOD FOR FORMING PORTED CYLINDER SLEEVE LINER FOAM PATTERN

[75] Inventors: Christopher R. Irgens, Elm Grove; Francis V. Bailey, Racine, both of Wis.

[73] Assignee: Outboard Marine Corporation, Waukegan, Ill.

[21] Appl. No.: 171,574

[22] Filed: Mar. 22, 1988

[51] Int. Cl.⁵ .................. B29C 39/26; B29C 67/20
[52] U.S. Cl. .................... 264/51; 264/334; 264/DIG. 10; 425/577; 249/145; 249/151
[58] Field of Search .................... 164/246, 34, 35; 264/51, DIG. 10, DIG. 11, DIG. 12, 53, 334; 425/DIG. 12, DIG. 14, DIG. 58, DIG. 35, 577; 249/144, 145

[56] References Cited

U.S. PATENT DOCUMENTS

| | | | |
|---|---|---|---|
| 2,124,998 | 7/1938 | Beckmann | 249/145 |
| 2,357,407 | 9/1944 | Kurtz | 425/DIG. 35 |
| 2,680,276 | 6/1954 | Filangeri | 249/145 |
| 2,829,400 | 4/1958 | Morin | 264/DIG. 10 |
| 2,948,031 | 8/1960 | Webb | 249/145 |
| 3,060,509 | 10/1962 | McCubbino, Jr. | 249/145 |
| 3,165,788 | 1/1965 | Davidson | 249/145 |
| 3,170,010 | 2/1965 | Schultz et al. | 264/51 |
| 3,281,510 | 10/1966 | Lovret | 264/51 X |
| 4,007,903 | 2/1977 | Riblet | 249/145 |
| 4,080,135 | 3/1978 | Clark | 425/414 |
| 4,691,754 | 9/1987 | Trumbauer et al. | 164/246 X |
| 4,721,149 | 1/1988 | Hesterberg et al. | 164/246 X |

FOREIGN PATENT DOCUMENTS

| | | |
|---|---|---|
| 1130924 | 10/1968 | United Kingdom . |
| 1191155 | 5/1970 | United Kingdom . |
| 1240677 | 7/1971 | United Kingdom . |
| 2088762 | 6/1982 | United Kingdom . |
| 2193132 | 2/1988 | United Kingdom . |

Primary Examiner—Hubert C. Lorin
Attorney, Agent, or Firm—Michael, Best & Friedrich

[57] ABSTRACT

A single-piece foam pattern for use in the lost foam casting of a ported cylinder sleeve is formed in a molding tool having a pair of displaceable elements and a removable center core. Ports, of preselected size, shape and location, are defined by movable cores which are extended into position between the displaceable elements and the center core. Following introduction of a molding material, the movable cores are retracted after which the mold elements and center core are separated and the foam pattern is removed.

3 Claims, 2 Drawing Sheets

METHOD FOR FORMING PORTED CYLINDER SLEEVE LINER FOAM PATTERN

BACKGROUND OF THE INVENTION

This invention relates generally to internal combustion engines and, more particularly, to ported cylinder sleeve liners for use in two-stroke internal combustion engines. More particularly still, this invention relates to methods and apparatus for manufacturing ported cylinder sleeve liners through the lost foam casting process.

Ported cylinder sleeve liners adapted for use in two-stroke internal combustion engines have been sand cast using sand cores to form the ports. Accuracy in the finished casting, particularly in the area of the port edges, requires accurate positioning of the sand cores and can be difficult to achieve.

SUMMARY OF THE INVENTION

The invention provides a one-piece foam pattern adapted for use in casting, by means of the lost foam process, a ported cylinder sleeve, the one piece foam pattern comprising a unitary matrix of a cellular plastic pattern.

The invention also provides a one-piece foam pattern adapted for use in casting, by means of the lost foam process, a ported cylinder sleeve. The one-piece foam pattern comprises a continuous, homogenous, seamless matrix of cellular plastic pattern having the general shape of a hollow cylinder and including at least one port opening through the sidewall of the cylinder. The port is shaped so that the perimeter defined by the port along the interior of the cylinder, does not, when projected outwardly from the interior of the cylinder in a direction perpendicular to a diametrically extending parting plane, lie wholly within the perimeter defined by the port along the exterior of the cylinder.

The invention also provides a process for forming a one-piece ported cylinder sleeve foam pattern comprising the steps of moving the opposed elements of a two-piece molding tool into registry with each other so as to form therebetween a generally cylindrical hollow cavity conforming substantially to the exterior size and shape of a ported cylinder sleeve. Next, a center core is inserted into the hollow cavity so as to define, between the center core and the molding tool elements, a hollow space conforming substantially to the size and shape of the ported cylinder sleeve. Next, at least one movable core is moved into the space between the center core and the molding tool elements so as to occupy a volume corresponding to the size, shape and location of a desired port to be formed in the ported cylinder sleeve. The space between the center core and the molding tool elements, and around the movable core, is filled with a cellular plastic pattern. Thereafter, the movable core is moved from the space between the center core and the molding tool elements and the molding tool elements and center core are displaced from one another so as to permit removal of the cellular plastic pattern.

The invention also provides an apparatus for molding a one-piece foam pattern adapted to be used in the lost foam casting of a ported cylinder sleeve. The apparatus comprises a molding tool having a pair of displaceable elements adapted to be moved into and out of registry with each other and shaped so as to define, when in registry with each other, a cavity conforming in size and shape to the exterior size and shape of the ported cylinder sleeve. The apparatus further comprises a center core insertable into the cavity defined by the molding tool elements, and a movable core conforming in shape and size to the shape and size of a port to be formed in the ported cylinder sleeve. Means are provided for moving the movable core into and out of a desired position between the molding tool elements and the center core.

Figure 1:
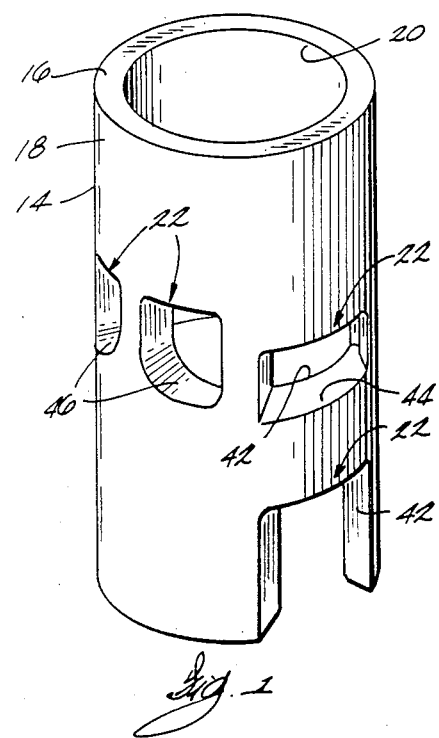
FIG. 1 is a perspective view of a one-piece ported cylinder sleeve foam pattern embodying various features of the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DESCRIPTION OF THE PREFERRED EMBODIMENT

Referring to the drawings, and, in particular, to FIGS. 1-4, a one-piece foam pattern 10, adapted for use in the lost foam casting of a ported cylinder sleeve, is illustrated. Also illustrated is an apparatus 12 and method for forming the one-piece foam pattern 10.

Referring particularly to FIG. 1, the one-piece foam pattern 10 generally comprises a unitary, continuous, homogenous, seamless matrix of a molding material consisting essentially of a cellular plastic pattern such as, for example, expanded polystyrene, having the general shape of a hollow cylinder 14. The one-piece foam pattern 10 corresponds in size and shape to the size and shape of a cast metal cylinder sleeve intended for use in an internal combustion engine such as a two-stroke internal combustion engine adapted for use in a marine propulsion device.

As illustrated, the cylinder 14 includes a sidewall 16 having inner and outer surfaces 18, 20 and further includes one or more ports 22 opening through the sidewall.

Figure 2:
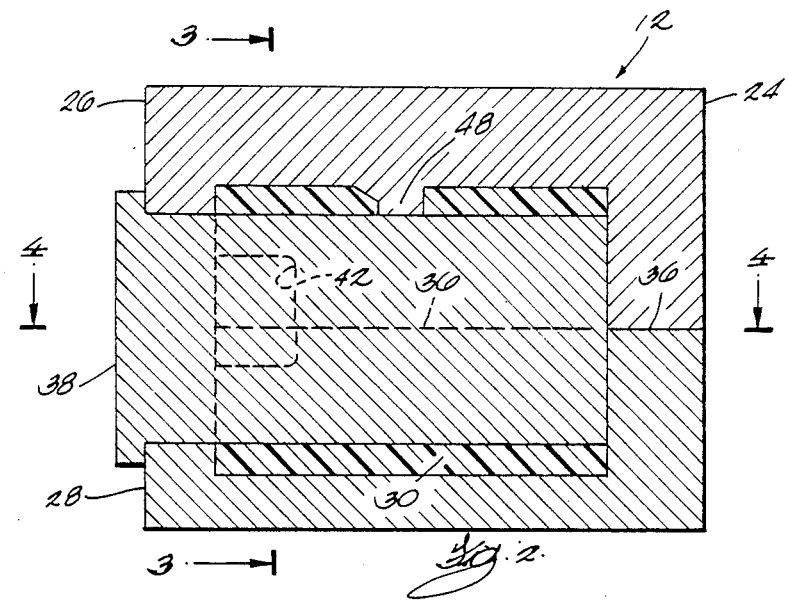
FIG. 2 is a cross-sectional view of the one-piece foam pattern shown in FIG. 1 taken along line 2—2 thereof, further illustrating an apparatus and method for forming the one-piece foam pattern.
Figure 4:
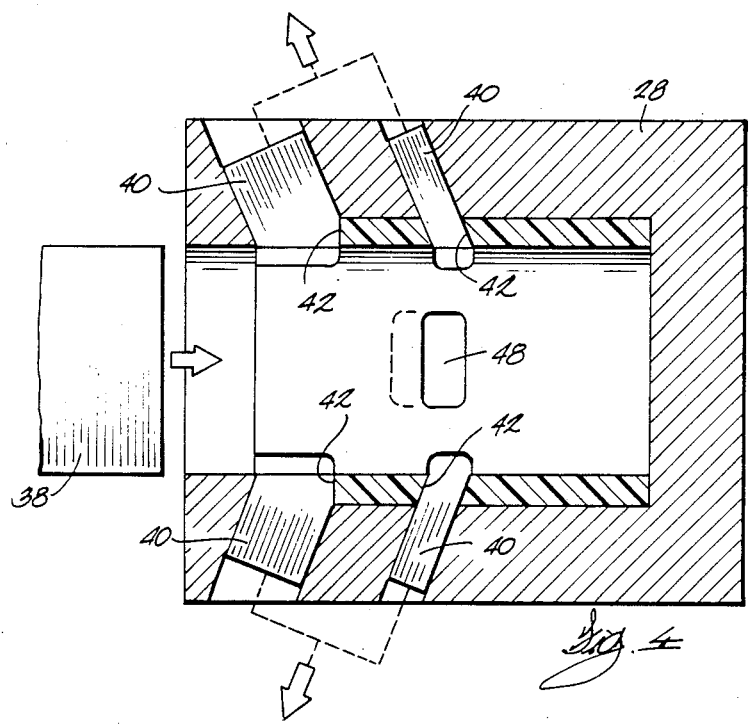
FIG. 4 is a cross-sectional view of the apparatus and one-piece foam pattern shown in FIG. 2 taken along line 4—4 thereof.
Figure 3:
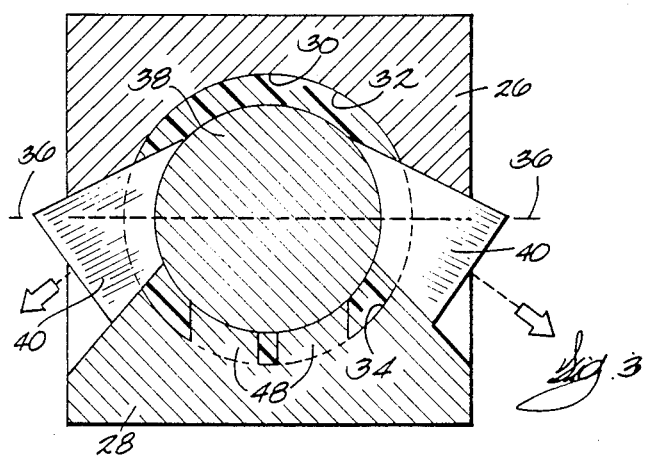
FIG. 3 is a cross-sectional view of the one-piece foam pattern and apparatus shown in FIG. 2 taken along line 3—3 thereof.

Referring to FIGS. 2-4, the apparatus 12 for forming the one-piece foam pattern 10 includes a pattern molding tool 24 having a pair of displaceable elements or halves pattern 26, 28 adapted to be moved into and out of registry with each other. Each of the mold tool elements or halves 26, 28 is shaped so as to define, when in registry with the opposed element or half, a cavity 30 conforming in size and shape to the exterior size and shape of the desired ported cylinder sleeve. In the illustrated embodiment, each of the mold tool elements or halves 26, 28 includes a substantially semi-cylindrically shaped recess 32, 34. The semi-cylindrically shaped recesses 32, 34 cooperate to form the cylindrical recess 30 and the opposed faces of the molding tool halves 32, 34 define a diametrically extending parting line or plane 36 as best seen in FIG. 3.

To form the hollow interior of the one-piece foam pattern 10, the apparatus 12 further includes a generally cylindrically shaped center core 38 insertable into the cavity 30 defined by the molding tool elements or halves 26, 28. The center core 38 is of somewhat smaller diameter than the cavity 30 and is coaxially aligned with the cavity 30 so that an annular gap of substantially constant thickness is formed between the exterior of the center core 38 and the cavity 30 formed by the molding tool elements or halves 26, 28. The generally annular space thus formed generally corresponds to the desired size and shape of the one-piece foam pattern 10 and of the finished ported cylinder sleeve.

The various ports 22 formed in the one-piece foam pattern 10, and thus in the finished ported cylinder sleeve cast therefrom, are defined by one or more movable cores 40 adapted to be controllably extended into, and retracted from, the space formed between the center core 38 and the molding tool elements or halves 26, 28. In the illustrated embodiment, the one-piece foam pattern 10 includes upper and lower transfer ports 42 on each side. Each of these ports 42 includes at least one beveled side edge 44 so that the perimeter defined by the port 42 along the interior of the cylinder 14 does not, when projected outwardly in a direction perpendicular to the parting plane 36, lie wholly within the perimeter defined by the port along the exterior of the cylinder. Accordingly, the movable cores 40 which define the ports 42 must be moved in other than a purely perpendicular direction relative to the parting plane 36 in order to avoid distortion of the port in the finished foam pattern 10 following molding. As shown in FIGS. 3 and 4, the movable cores 40 each move along a line of travel which is skewed relative to the parting plane 36.

For those ports, such as, for example, the exhaust ports 46, wherein the perimeter defined by the port along the interior of the cylinder does, when projected in a direction perpendicular to the parting plane 36, lie wholly within the perimeter defined by the port along the exterior of the cylinder, a non-movable core 48 can be provided on either of the molding tool halves or elements 26, 28 in order to form such ports. Because such ports do not require other than purely perpendicular movement of the core relative to the parting plane 36, simple separation of the molding tool halves or elements 26, 28 from one another is sufficient to release the resulting molded particle 10 without damage to or enlargement of the port.

In operation, the opposed elements or halves 26, 28 of the molding tool 24 are first moved into registry with each other so as to form therebetween the generally cylindrical hollow cavity 30 conforming substantially to the exterior size and shape of the ported cylinder sleeve. Next, the center core 38 is inserted into the hollow cavity 30 so as to define, between the center core 38 and the molding tool elements or halves 26, 28, a hollow space conforming substantially to the size and shape of the ported cylinder sleeve. For those ports 46 wherein the perimeter defined by the port along the interior of the cylinder lies, when projected in a direction perpendicular to the parting plane 36, wholly within the perimeter defined by the port along the interior of the cylinder 14, a non-moving core 48 is positioned on the molding tool half 28 so as to displace, between the molding tool half and the center core 38, a volume corresponding in size and shape to the desired port 46. For those ports 42 wherein the perimeter defined by the port along the interior of the cylinder does not, when projected in a direction perpendicular to the parting plane 36, lie wholly within the perimeter defined by the port along the exterior of the cylinder 14, the movable cores 40 are next extended into the space defined between the mold tool halves 26, 28 and the center core 38. Next, foam is introduced into the space thus defined and, after the foam has hardened, the movable cores 40 are withdrawn from the space between the mold tool halves 26, 28 and the center core 38 along a line of travel sufficient to avoid displacement of or interference with the immediately adjacent foam. Following retraction of the movable cores 40, the molding tool halves 26, 28 can be separated, and the center core 38 withdrawn, in order to free the molded one-piece foam pattern 10.

Figure 5:
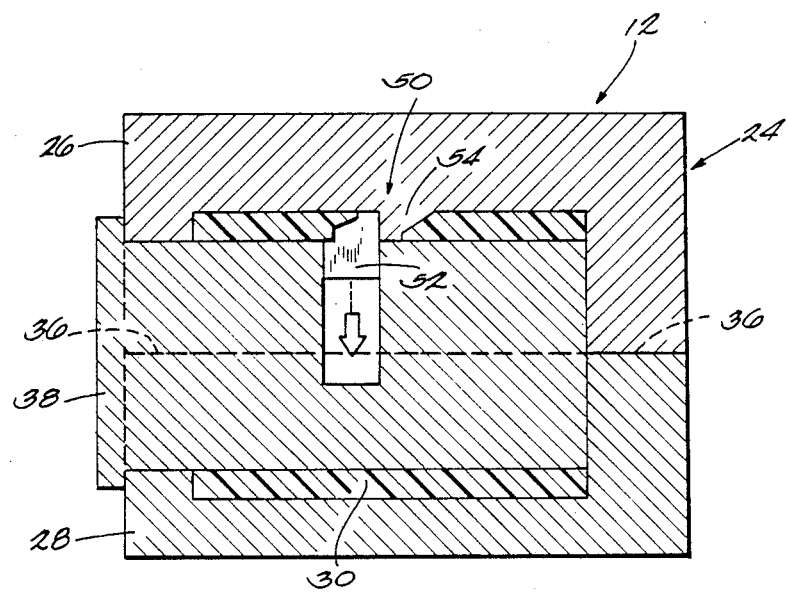
FIG. 5 is a fragmentary cross-sectional view of a movable core incorporated in the apparatus illustrated in FIGS. 2-4.

Referring to FIG. 5, it is possible to form the ports 42 by means of cores 50 having both moving and non-moving elements 52 and 54. In the example illustrated in FIG. 5, the sloping port 42 illustrated is formed by means of a fixed core element 54, mounted on one of the molding tool halves 26, and a movable core 52 which can be extended from or retracted into the center core 38. When extended, the movable core 52 cooperates with the fixed core 54 to define the sloping port 42. Following introduction and hardening of the foam, withdrawal of the movable core 52 into the center core 38 permits the center core 38 to be withdrawn, while separation of the molding tool halves 26, 28 permits the fixed core 54 to be drawn away from the hardened foam without damage to the resulting one-piece foam pattern 10.

It will be appreciated that, depending upon the circumstances and the particular configuration of the desired ported cylinder sleeve, the movable cores 42 or 52 can be arranged to extend from either the molding tool halves 26, 28 or from the center core 38. In addition, movable cores can be mounted on both the molding tool halves 26, 28 and the center core 38 as appropriate and necessary for the desired foam pattern 10.

Various mechanisms, such as electrically, hydraulically or pneumatically actuated lever or cam linkages can be utilized for extending and retracting the movable cores relative to the molding tool halves 26, 28 or the center core 38.

Various other features and advantages of the invention are set forth in the following claims.

What is claimed is:

1. A process for forming a one-piece ported cylinder sleeve foam pattern, said process comprising the steps of moving opposed elements of a two-piece mold tool into registry with each other so as to form therebetween a generally cylindrical hollow cavity having an axis and conforming substantially to the exterior size and shape of a ported cylinder sleeve, inserting a center core into the hollow cavity so as to define between the center core and the mold tool elements a hollow space conforming substantially to the size and shape of the ported cylinder sleeve, moving, at a non-perpendicular angle relative to a plane having therein said axis, at least one movable core into the space between the center core and the mold tool elements so as to occupy a volume corresponding to the size, shape and location of a port to be formed in the cylinder sleeve, filling the space between the center core and the mold tool elements and around the movable core with a molding material, moving the movable core from the space between the center core and the mold tool elements, and displacing the mold tool elements and the center core away from one another so as to permit removal of the molded ported cylinder sleeve.

2. A process in accordance with claim 1 wherein the molding material consists essentially of a cellular plastic pattern.

3. A process in accordance with claim 2 wherein the cellular plastic pattern consists essentially of expanded polystyrene.

* * * * *